Jan. 2, 1962 R. S. KNECHT 3,015,363
HELICOPTER-REACTION TIP BRAKE
Filed Jan. 28, 1960

Inventor
ROBERT S. KNECHT

By R. J. Tompkins
Attorney

3,015,363
HELICOPTER-REACTION TIP BRAKE
Robert S. Knecht, 23 Copperdale Lane, Huntington, N.Y.
Filed Jan. 28, 1960, Ser. No. 5,322
2 Claims. (Cl. 170—135.4)
(Granted under Title 35, U.S. Code (1952) sec. 266)

The invention described herein may be manufactured and used by or for the Government of the United States of America for governmental purposes without the payment of any royalties thereon or therefor.

The present invention relates to a helicopter reaction type rotor braking system and more particularly to a helicopter reaction type rotor braking system which provides means for reversing the thrust of the reaction jets to produce a braking action of the rotor.

Prior to this invention, hydraulic and mechanical devices were employed to exert a pressure against the rotor shaft and thus bring the rotor to a halt. In some instances, where reaction type rotors are employed, various means are used to reverse the thrust of the jets, one of the more common methods of reversing the thrust being to employ gears and linkage to rotate the discharge nozzle a full 180° to produce the braking action. Another method was to use two solenoid operated valves in each tip of the rotor, opening one valve for propulsive thrust and then opening the other valve and closing the first when braking thrust is desired.

In the present invention, the braking action is produced by a novel way of reversing the thrust of the gases from the reaction jet which brings the rotor to a rapid halt. It accomplishes this result by utilizing a single valve in each tip of the rotor to redirect the gases in such a manner that they will produce a braking action on the rotor when it is desired to stop the rotor. This system provides a brake which has greater braking capacity and is less complex than presently used systems.

An object of the present invention is the provision of an improved braking system for a helicopter using a reaction jet type rotor.

Another object of the invention is the provision of a braking system for a helicopter rotor which has a greater braking capacity and is less complex than previously used rotor brakes.

Still another object of the invention is the provision of a braking system for a helicopter rotor which provides an improved braking action and requires less weight and less moving parts than previously employed braking systems.

Other objects and many of the attendant advantages of this invention will be readily appreciated as the same becomes better understood by reference to the following detailed description when considered in connection with the accompanying drawings wherein.

Figure 1:
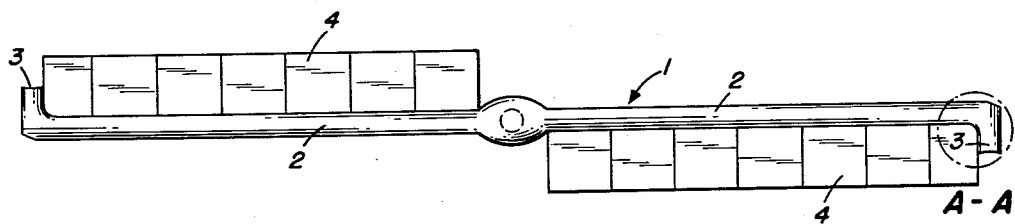
FIG. 1 shows a plan view of a helicopter rotor.

Referring now to the drawings, wherein like reference characters designate like or corresponding parts throughout the several views, there is shown in FIG. 1, a helicopter rotor 1 which is hollow so as to provide a duct 2 through which the propulsive gases or air may pass to be discharged through jets 3.

Figure 2:
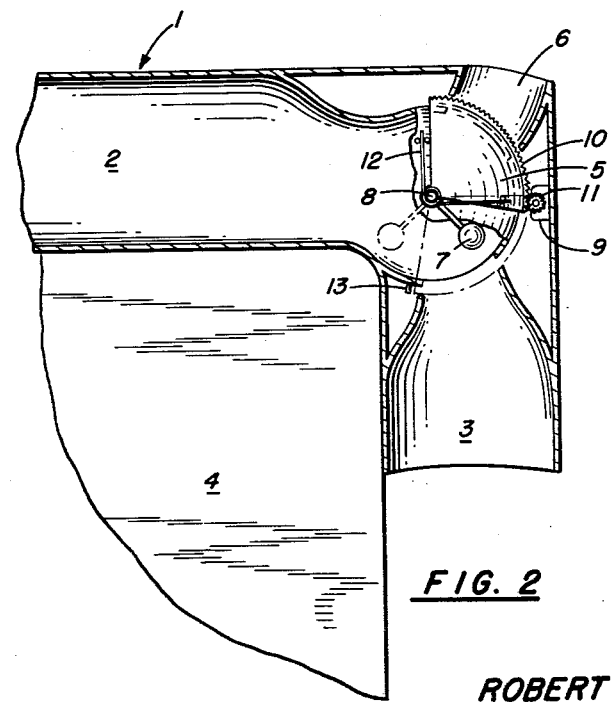
FIG. 2 shows a detail view of the tip of the rotor as encircled by circle A—A in FIG. 1.

FIG. 2 which is an enlarged detail of the area encircled by circle A—A in FIG. 1, shows the tip of the rotor 1, with a duct 2 through which the gases pass. After passing through the duct 2, the gases are discharged through the propulsive discharge jets 3. Attached to the rotor ducts 2 are rotor extensions 4, which provide additional surface area so as to impart increased lift to the helicopter. The direction in which the gases flow is controlled by a diverter valve 5. When the diverter valve 5 is in the position shown in FIG. 2, the braking jet 6 is closed. The diverter valve 5 is provided with a biasing spring 12 which biases the valve to its closed position as shown in FIG. 2, as an additional safety feature, weight 7 which is attached to valve 5 serves to additionally hold the valve 5 in its closed position with respect to the braking jet 6. The valve 5, which pivots about pivot point 8, is held in this position by the centrifugal force created by the rotation of the rotor 1 and by biasing spring 12 when the rotor is stopped as explained above.

When it is desired to bring the rotor 1 to a stop, the actuating means, which is built into the tip of the rotor, is energized. An electric motor 9 is shown in FIG. 2, but it is to be understood that other means may be employed. For instance, a hydraulic motor with a rack and pinion or an electric solenoid with a geared rack attached thereto which would engage the geared portion of the valve would serve the same purpose equally as well. Upon energization of the electric motor 9, the diverter valve 5 through its geared connection 10 with driving gear 11, which is a one-way gear driven by electric motor 9, pivots about pivot point 8 and rotates clockwise until the valve 5 comes into contact with stop pin 13 which de-energizes the electric motor 9, closing the propulsive discharge jet 3 and opening the braking jet 6. With the propulsive discharge jet 3 closed and the braking jet 6 opened the gases are directed into the direction of rotation of the rotor 1 and thus brings the rotor to a quick halt.

After the rotor 1 has been brought to a halt again, the driving gear 11 is released so that it can rotate freely in a clockwise direction and the valve 5, under the influence of biasing spring 12 pivots about pivot point 8, rotates in a counterclockwise direction and thereby returns the valve 5 to the position shown in FIG. 2. The rotor is now ready for use again.

Obviously many modifications and variations of the present invention are possible in the light of the above teachings. It is therefore to be understood that within the scope of the appended claims the invention may be practiced otherwise than as specifically described.

What is claimed is:

1. A reaction type rotor for helicopters comprising a plurality of air foils mounted for rotation about a common axis and formed with axial passages therein, a propulsion nozzle located within said rotor and near the tip thereof for exhausting the gases in such a manner as to produce rotation of said rotor, a braking nozzle located within said rotor and near the tip thereof for exhausting gases in such a manner as to produce a braking action on said rotor, a diverter valve positioned intermediate said propulsion nozzle and said braking nozzle for alternately directing the discharge of said gases into one of said nozzles, a biasing spring and a weight attached to said diverter valve for assisting in closing said braking nozzle when it is desired to operate said rotor, positive means for positioning said diverter valve into one of two positions whereby said propulsion nozzle is opened in one position while said braking nozzle is closed and said propulsion nozzle is closed while said braking nozzle is opened in the other position.

2. A reaction type rotor as claimed in claim 1 wherein said positive means for positioning said diverter valve into one of said two positions consists of a geared portion which is integral with the outer periphery of said valve, a driving gear and an electric motor mounted in juxtaposition with said valve, said diverter valve being operatively connected with said electric motor through said driving gear which meshes with said geared portion of said diverter valve and changes the position of said diverter valve when said electric motor is energized.

(References on following page)

References Cited in the file of this patent

UNITED STATES PATENTS

| | | |
|---|---|---|
| 2,001,529 | Dornier | May 14, 1935 |
| 2,518,697 | Lee | Aug. 15, 1950 |
| 2,667,226 | Doblhoff | Jan. 26, 1954 |
| 2,921,435 | Landgraf | Jan. 19, 1960 |

FOREIGN PATENTS

| | | |
|---|---|---|
| 480,788 | Canada | Feb. 5, 1952 |
| 732,127 | Great Britain | June 22, 1955 |